United States Patent [19]

Hohl

[11] Patent Number: 5,791,648

[45] Date of Patent: Aug. 11, 1998

[54] INDUCTIVE SENSORY APPARATUS

[76] Inventor: G. Burnell Hohl, 21 Driftway La., New Canaan, Conn. 06840

[21] Appl. No.: 603,171

[22] Filed: Feb. 20, 1996

[51] Int. Cl.$^6$ ........................................................ A63F 9/00
[52] U.S. Cl. ................................................................ 273/238
[58] Field of Search ................................. 273/236, 237, 273/238, 239; 340/431; 324/311; 439/38, 39, 40, 43

[56] References Cited

U.S. PATENT DOCUMENTS

| | | | |
|---|---|---|---|
| 4,638,253 | 1/1987 | Jaskolski et al. | 324/311 |
| 5,488,352 | 1/1996 | Jasper | 340/431 |

*Primary Examiner*—George Manuel
*Attorney, Agent, or Firm*—Grimes & Battersby

[57] ABSTRACT

An inductive sensory system is provided. The system includes at least one object encoded with conductive material and a reader for use in detecting the presence or absence of the conductive material in the coded object. The reader includes a plurality of single coils and detection means for measuring changes in the self inductance of the coils due to the presence or absence of conductive material in the object. The sensory system further includes control means interconnected to the detection means. The control means are adapted to receive a signal from the detection means, translate the signal and generate a control signal for transmission to an external reactive member such as a light, sound or voice generator.

27 Claims, 2 Drawing Sheets

INDUCTIVE SENSORY APPARATUS

BACKGROUND OF THE INVENTION

1. Field of the Invention

The present invention relates generally to an electronic sensory apparatus and, more particularly, to such apparatus for determining the identity and position of a conductive pattern or object in close proximity to the sensory surface of the apparatus. The invention has particular application in the area of toys, games and publishing, where it may be used to identify the presence and location of individual objects or game pieces, or of a pointing device, used to select a word or picture in a book. It may also be used to "read" data from an individual card placed upon a card "reading" surface. Such cards may include playing cards, educational and language flash cards, game cards or sports cards and may be used in playing a game, in triggering a particular sound or voice, or to initiate a certain mechanical action or a visual display. Because of the unique design of the present invention, several cards may be "read" simultaneously, without the need to "swipe" them through a card reader device.

Most "presence sensor" devices use reed switches and magnets to track the motion of magnetic elements. These devices usually have one reed switch placed under a plurality of discrete positions on the sensor. When an object with a magnet integrated therein is placed in a particular position, the reed switch is activated and remains closed until the object is removed. In this way the position of the objects placed on the sensor may be determined and tracked.

However, such devices cannot determine the identities of the objects placed upon the surface of the sensor. Only when specific, predefined objects are placed in predefined positions on the sensory surface—such as chess pieces placed in their opening positions on a chess board—can such devices determine the identities of the objects placed upon the sensor. Furthermore, such devices are often inaccurate if the objects are moved quickly, or if two objects occupy the same position on the sensory surface.

The present invention uses the phenomenon of the change in inductance of a coil of wire that occurs when a conductive element is brought near the coil to detect a conductive pattern imprinted on the surface of an object or to determine the location of a conductive object placed above the surface of the sensory apparatus. The conductive pattern may be detected on the page of a book, on a card or sticker or from any other surface or object imprinted with the pattern. The apparatus would be able to "read" the codes imprinted upon the object, and trigger or control an action based upon that code. Such an implementation of the apparatus is particularly useful in the field of electronic learning aids. A flashcard or the page of a book may be imprinted with a conductive code, which, when read by the sensor, would trigger the playback of a word or sentence that corresponds to the flashcard or page. Such a sensor has many uses as a game device. For example, the sensor may be used in conjunction with a board game in which "secret codes" are invisibly imprinted on playing cards. The sensor can also be used with a bowling game to determine how many pins have been knocked down. Furthermore, the location of any object may be detected by the sensor, as long as a conductive material forms part of the object. For example, a doll's hand, a magic wand, a pen or a player's token may be detected by the apparatus. The code generated by the conductive pattern or object can serves to trigger a variety of specific audio, visual or mechanical effects, such as playback of a line of a story or the sound of a dog barking when a specific area on the apparatus is pointed at with a conductive device.

2. Description of the Prior Art

The prior art fails to specifically address either the problem or the solution arrived upon by applicant. Inventors have long been trying to come up with devices to determine the identity and position of objects, particularly game pieces, on a sensory surface. See for example, U.S. Pat. No. 4,492,581 which issued to K. Arai et al. on Jan. 8, 1985 for a Gameboard Teaching Apparatus. See also, U.S. Pat. No. 4,981,300 which issued to E. Winkler on Jan. 1, 1991 for Sensory Games; U.S. Pat. No. 5,013,047 which issued to G. Schwab on May 7, 1991 for an Apparatus for Determining the Identity and Position of Game Objects; U.S. Pat. No. 5,082,286 which issued to P. Ryan et al. on Jan. 21, 1992 for Sensory Games; and U.S. Pat. No. 5,129,654 which issued to B. Bogner on Jul. 14, 1992 for an Electronic Game Apparatus.

Furthermore, the electronic phenomenon of inductance in a coil has long been established. Electronic devices incorporating inductive technology are similarly not uncommon. See, for example, U.S. Pat. No. 4,605,844 which issued to D. Haggan on Aug. 12, 1986 for a Computerized Transaction Card with Inductive Data Transfer; and U.S. Pat. No. 4,818,853 which issued to T. Ohta, et al., on Apr. 4, 1989 for a Data Card With Inductive Signal Transfer Device.

As will be appreciated, however, none of these prior patents even address the problem faced by applicant let alone offer the solution proposed herein.

SUMMARY OF THE INVENTION

Against the foregoing background, it is a primary objective of the present invention to provide an electronic inductive sensory apparatus for determining the identity of a conductive pattern placed in close proximity to the sensory surface of the apparatus.

It is a further object of the present invention to provide such an electronic sensory apparatus that senses the position or presence of a conductive object in close proximity to the sensory surface of the apparatus.

It is yet another object of the present invention to provide such an electronic sensory apparatus that is able to activate a specific audio, visual or mechanical effect that is triggered by the specific conductive pattern or object.

To the accomplishments of the foregoing objects and advantages, the present invention, in brief summary, comprises an inductive sensory system which includes at least one object encoded with conductive material and a reader for use in detecting the presence or absence of the conductive material in the coded object. The reader includes a plurality of single coils and detection means for measuring changes in the self inductance of the coils due to the presence or absence of conductive material in the object. The sensory system further includes control means interconnected to the detection means. The control means are adapted to receive a signal from the detection means, translate the signal and generate a control signal for transmission to an external reactive member such as a sound or voice generator.

In a preferred embodiment, the reader includes a matrix of coils etched onto a thin PC board. A microcontroller multiplexes the individual coils or groups of coils by connecting them sequentially to an LC oscillator where they act as inductors in the oscillator circuit. Changes in the inductance of any coil result in a corresponding change in the amplitude and frequency of oscillation of the oscillator circuit. The oscillation amplitude of each coil is compared against at least one voltage threshold by an amplitude comparator circuit. The amplitude comparator circuit is sampled by the microcontroller to detect the inductance of each coil. The microcontroller then assigns a value to each coil that is determined by the inductance of the coil. By assigning a value to each individual coil or coil group, the microcontroller determines the code that uniquely identifies the object placed next to the electronic sensory apparatus. The apparatus may be used to detect unique multi-bit ID codes printed on cards, pages of books or other objects and trigger specific audio or visual effects or mechanical actions appropriate for the specific multi-bit ID codes. The apparatus may also be used to sense and determine the location or presence of any conductive object placed above the surface of the apparatus.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

DETAILED DESCRIPTION OF THE INVENTION

Figure 1:
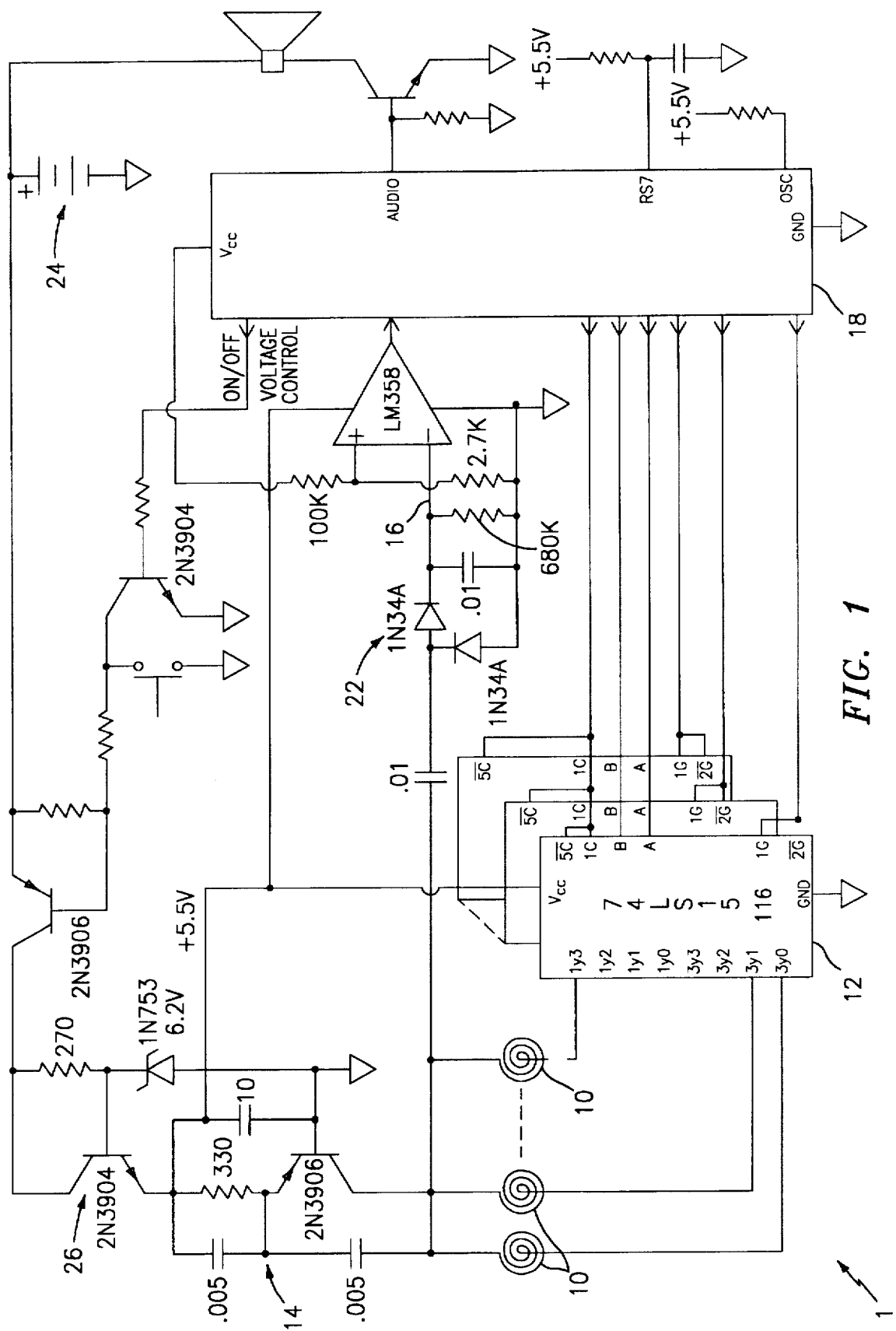
FIG. 1 is an electronic circuit diagram of the electronic sensory apparatus of the present invention.
Figure 2:
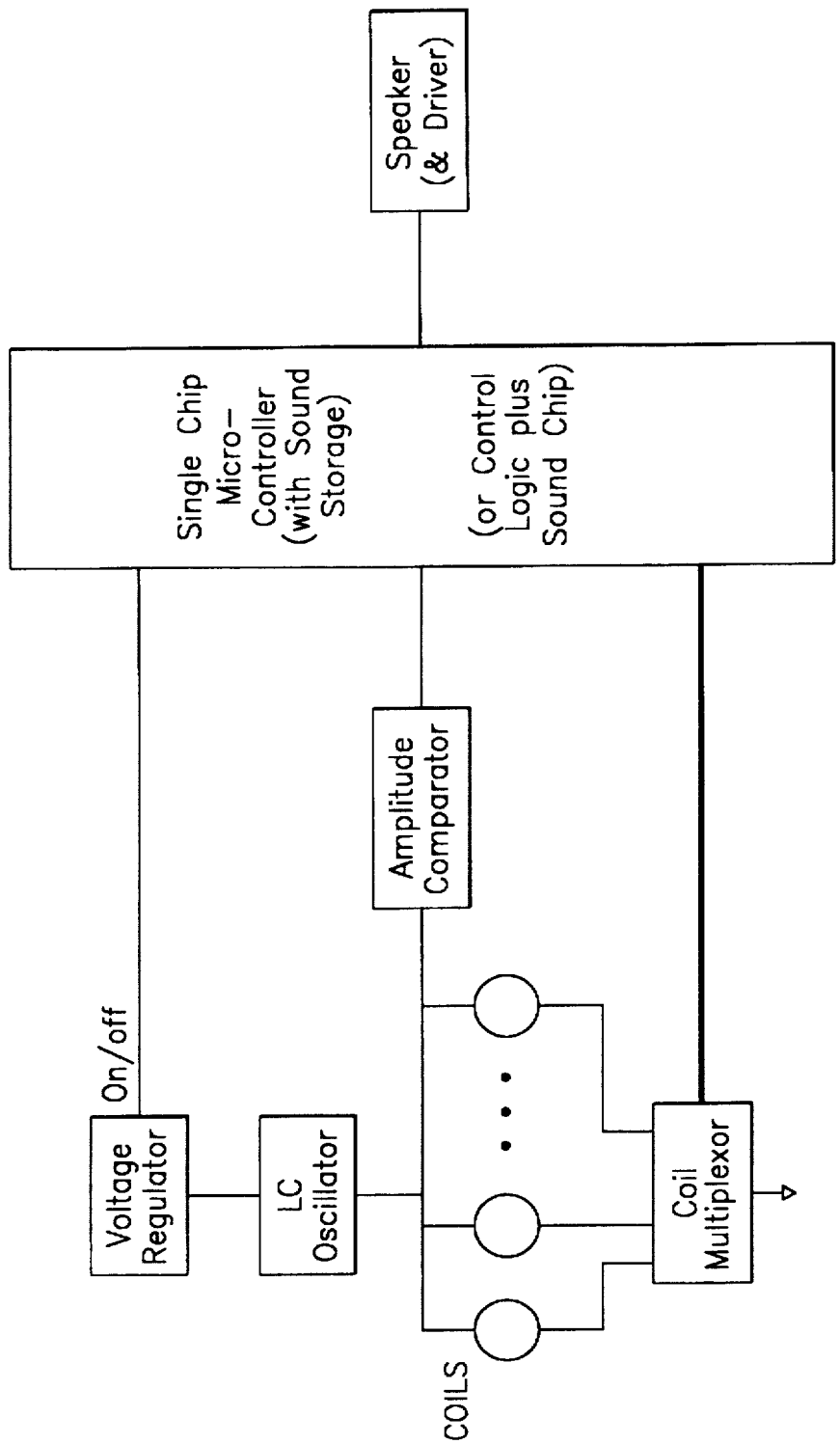
FIG. 2 is a block diagram depicting the operation of the electronic sensory apparatus of the present invention.

Referring to the drawings and, in particular, to FIGS. 1-2 thereof, the electronic sensory apparatus of the present invention, referred to generally by reference number 1, consists of a matrix of coils 10 embedded in the surface of the apparatus. In the preferred embodiment, the coils 10 are etched onto a PC board (not shown). A multiplexor 12 selects the individual coils 10 by connecting them sequentially to an LC oscillator 14 where they act as inductors in the oscillator circuit. Changes in the inductance of any coil 10 results in corresponding changes in the amplitude and the frequency of oscillation of the oscillator circuit. The oscillation amplitude of each coil 10 is compared against at least one voltage threshold by a amplitude comparator 16. The amplitude comparator 16 is sampled by a microcontroller 18 to detect the inductance of each coil 10. The microcontroller 18 then assigns a value to each coil 10 that is determined by the inductance of the coil 10. By assigning a value to each individual coil 10, the microcontroller 18 determines the code that uniquely identifies the object placed next to the electronic sensory apparatus 1.

The number and size of the coils 10 depends upon a number of factors, including: (1) the number of bits used in the code patterns to be detected; (2) the number of code patterns to be simultaneously detected; and (3) the number of discrete locations where the presence of a conductive object is to be determined. In the preferred embodiment, the coils 10 of the apparatus 1 of the present invention are ¾ inch in diameter, using approximately 10.5 turns per coil 10 with approximately 0.015 inch line width and spacing. Using these dimensions, up to 4095 binary codes can be represented on an area the size of a standard playing card, or up to 12 discrete locations can be mapped on the same area. If more codes or more discrete locations are desired, the diameters of the coils 10 may be reduced. However, this reduction requires reducing line widths, and results in reduced inductance, making circuit design more critical.

In the preferred embodiment, the coils 10 are etched on a 0.031 inch PC board (not shown), with the coils 10 on the underside of the board, leaving the top side of the PC board flat. By placing the coils 10 on the underside of the PC board, the surface of the apparatus 1 may be made flat, allowing objects to be placed directly on the surface. For the apparatus 1 to be effective, it is desirable to keep short distances—no greater than ⅛ inch—between coils 10 and the conductive patterns or objects.

The coils 10 may be arranged on the surface of the apparatus 1 in any pattern. However, in the preferred embodiment, the coils 10 are arranged linearly in rows and columns in a checkerboard pattern. In an alternative embodiment, the coils 10 are arranged in a series of concentric circles. The only requirement as to the arrangement of the coils 10 on the surface of the apparatus 1 is that the pattern of coils 10 must match the pattern of conductive elements on the object to be "read" by the sensor.

A particular coil 10 is selected by the coil multiplexor circuit 12 consisting of at least one 74LS156 (octal) or 74LS05(hex) open collector chips. In an alternate embodiment, discrete bipolar transistors may also be used for coil 10 selection. Grounding a coil 10 effectively connects the coil 10 to the LC oscillator 14 by creating a ground path through the coil 10, thus enabling the LC oscillator 14. The frequency and amplitude of oscillation in the oscillator circuit will change whenever a conductive material is brought within close proximity of a coil 10. The baseline frequency of oscillation of the oscillator circuit depends largely upon the size and number of turns in the coils 10. In the preferred embodiment, the oscillator circuit operates at approximately 2.5 Mhz. The LC oscillator 14 operates at a very low oscillation amplitude of only a few hundred millivolts in order to minimize the effect of any external RF radiation from the circuit.

The amplitude comparator 16 compares the amplitude of the oscillation of each coil 10 against an amplitude threshold, which is predefined as the oscillation amplitude of the coil 10 when there is no conductive material nearby. In an alternative embodiment, the amplitude threshold may be variable, as set by the microcontroller 18, in order to optimize the sensitivity of the sensor to compensate for variations in coil 10 inductance and lead lengths, and to allow for greater distance between the coils 10 and the conductive material or code.

The amplitude converter 22 converts the peak to peak amplitude of the LC oscillator 14 output to a DC level which is compared to the amplitude threshold. The presence of conductive material next to a given coil 10 reduces the oscillation amplitude, driving the voltage level at the negative input of the amplitude comparator 16 below the threshold set at the positive input, resulting in an increased comparator 16 output. If conductive material is not present above the coil 10, the comparator's 16 output will be low.

In an alternate embodiment, the change in inductance of the coils 10 may be effectuated by comparing the oscillation frequency of the coils 10 against a threshold frequency or frequencies.

In the preferred embodiment, the multiplexing and sampling of the coils is controlled by the means of a combination microcontroller and voice chip 18. In alternate embodiments, the same control may be achieved by a microcontroller chip with or without a separate voice chip (not shown) or by a discrete logic controller or ASIC chip (not shown). The microcontroller chip 18 sequences through the various coils 10 by applying a coil select address to the coil multiplexor circuit 12, waits a fixed time interval (a few milliseconds) for the voltage detection circuitry to settle, and reads the coil 10 "state" from the amplitude comparator 16. Knowing the state of all the coils 10 reveals the ID code printed on the object or the location of a conductive object within the area covered by the coils 10. This information can be used to trigger specific events, such as the playback of the appropriate words or sounds in the voice memory that correspond to the picture pointed to or printed on the object covered by the sensor 1, the activation of visual or sound effects or the initiation of mechanical actions, such as activation of an electronic lock or security system.

In the preferred embodiment, each coil 10 is assigned a value of zero (0) if there is no change in the inductance of the coil 10, and a value of one (1) if there is any significant change in the inductance of the coil 10. Thus a binary code is generated by sampling the matrix of coils 10. This code may then be used to trigger specific audio effects, visual effects or mechanical actions by the microcontroller and a voice chip. Alternatively, the code may be used to determine the position or positions of at least one conductive object placed above the surface of the apparatus 1.

In an alternate embodiment, several different values may be assigned to each coil 10 or groups of coils 10 depending upon the number of turns of the coil(s) covered by conductive material which affects the oscillation amplitude of the coil 10. A different value may be assigned to each coil 10 depending upon whether the oscillation amplitude reaches certain predefined threshold levels. In such an embodiment, the sensitivity of the amplitude converter 22 is very critical.

In the preferred embodiment, the electronic sensory apparatus 1 of the present invention is battery 24 operated. A voltage regulator 26 may be used to maintain a constant voltage to the LC oscillator 14 and coil multiplexor circuitry 12. The voltage regulator 26 acts to prevent a change in the supply voltage from seriously affecting the amplitude of oscillation in the oscillator circuits created with the individual coils 10. In the preferred embodiment, a Zener regulator may be used to maintain a constant voltage. In an alternate embodiment, the Zener regulator may be replaced by a 78L05 voltage regulator, which provides better regulation at greater cost.

Having thus described the invention with particular reference to the preferred forms thereof, it will be obvious that various changes and modifications can be made therein without departing from the spirit and scope of the present invention as defined by the appended claims.

Wherefore, I claim:

1. An inductive sensory system for use in reading a code contained on a coded object, said system including:
   at least one coded object including or encoded with a pattern of conductive material; and
   a reader for reading the code on said at least one coded object by detecting the presence or absence of the conductive material in said coded object, said reader including
       a plurality of single coils arranged in a pattern complimentary to said pattern of conductive material on said at least one object and
       detection means for measuring changes in the self inductance of said coils due to the presence or absence of conductive material in said coded object.

2. The sensory system of claim 1, wherein said detection means comprise an oscillator, a multiplexor connected to at least one of said coils and to said oscillator, and an amplitude detector.

3. The sensory system of claim 2, wherein said amplitude detector is adapted to measure the change in amplitude of oscillation caused by changes in the self inductance in said coils due to the presence or absence of conductive material in said coded object.

4. The sensory system of claim 1, wherein said detection means comprise an oscillator, a multiplexor connected to at least one of said coils and to said oscillator, and a frequency detector.

5. The sensory system of claim 4, wherein said frequency detector is adapted to measure the change in frequency of oscillation caused by changes in the self inductance in said coils due to the presence or absence of conductive material in said coded object.

6. The sensory system of claim 1, wherein said detection means comprise an oscillator and an amplitude detector connected to with said coils and to said oscillator.

7. The sensory system of claim 6, wherein said amplitude detector is adapted to measure the change in amplitude of oscillation caused by changes in the self inductance in said coils due to the presence or absence of conductive material in said coded object.

8. The sensory system of claim 1, further including control means interconnected to said detection means, said control means adapted to receive a signal from said detection means, translate said signal from said detection means, and generate a control signal to an external reactive member.

9. The sensory system of claim 8, wherein said control means comprises a microprocessor.

10. The sensory system of claim 8, wherein said reactive member is adapted to generate a sound in response to receipt of said control signal.

11. The sensory system of claim 8, wherein said reactive member is adapted to display a visual effect in response to receipt of said control signal.

12. The sensory system of claim 8, wherein said reactive member is adapted to effect mechanical motion in response to receipt of said control signal.

13. The sensory system of claim 1, wherein said object comprises a plurality of cards on which said code is printed which is adapted to be read by said reader.

14. The sensory system of claim 1, wherein said object comprises a plurality of stickers on which said code is printed which is adapted to be read by said reader.

15. The sensory system of claim 1, wherein said object comprises a plurality of pictures on which said code is printed which is adapted to be read by said reader.

16. The sensory system of claim 1, wherein said object comprises a plurality of pages in a book on which said code is printed which is adapted to be read by said reader.

17. The sensory system of claim 1, wherein said object comprises a plurality of molded figures on which said code is printed which is adapted to be read by said reader.

18. The sensory system of claim 1, wherein said object comprises a wand on which said code is printed which is adapted to be read by said reader.

19. The sensory system of claim 1, wherein said object comprises a stylus on which said code is printed which is adapted to be read by said reader.

20. The sensory system of claim 1, wherein said object comprises a plurality of game pieces on which said code is printed which is adapted to be read by said reader.

21. An electronic sensory apparatus, said electronic sensory apparatus including:
   a plurality of coils etched onto a PC board, or printed with conductive ink, which act as inductors in an LC oscillator circuit;

a means for selecting individual said coils or groups of said coils;

a means for supplying a current to said coils or groups of said coils to induce LC oscillation in said coils;

a means for detecting the amplitude or frequency of the said LC oscillation in the individual said coils created by said supply of current to said coils;

a means for comparing the said amplitude or frequency of the LC oscillation in the individual said coils or groups of said coils against at least one threshold oscillation amplitude or frequency;

a means for assigning a value to the individual said coils or groups of said coils dependant upon the said amplitude or frequency of the LC oscillation in the said coils;

a means for generating a code representing the combined said values of the plurality of said coils;

a means for triggering a specific event which corresponds to the said code; and a means for controlling said means for detecting, said means for comparing, said means for assigning, said means for generating and said means for triggering.

22. An electronic sensory apparatus, said electronic sensory apparatus including:

a plurality of ¾ inch diameter coils with 10.5 turns and line width and spacing of 0.015 inches etched onto a 0.031 inch thick PC board which act as inductors in an LC oscillator circuit;

a means for selecting individual said coils or groups of said coils, said means consisting of a multiplexor circuit, which further consists of at least one 74LS156 (octal) or 74LS05(hex) open collector chip or a discrete bipolar transistor;

a means for supplying a current to said coils to induce LC oscillation in said coils, said means consisting of an LC oscillator which operates at 2.5 MHz wherein said means for supplying a current further includes a voltage regulator, wherein said regulator consists of a Zener regulator or a 78L05 voltage regulator;

a means for detecting the amplitude or frequency of the said LC oscillation in the individual said coils created by said supply of current to said coils;

a means for comparing the said amplitude or frequency of the LC oscillation in the individual said coils against at least one threshold oscillation amplitude or frequency;

a means for assigning a value to the individual said coils or said coil groups dependant upon the said amplitude or frequency of the LC oscillation in the said coils;

a means for generating a code representing the combined said values of the plurality of said coils;

a means for triggering a specific event which corresponds to the said code; and a means for controlling said means for detecting, said means for comparing, said means for assigning, said means for generating and said means for triggering, said means for controlling consisting of a microcontroller, a combination microcontroller and voice chip, a microcontroller with separate voice chip, or a discrete logic or application-specific integrated circuit controller.

23. An inductive sensory system for use in reading a code contained on a coded object, said system including:

at least one coded object including or encoded with a pattern of conductive material; and a reader for reading the code on said at least one coded object by detecting the presence or absence of the conductive material in said coded object, said reader including
   at least one single coil positioned complimentary to said pattern of conductive material on said at least one object and
   detection means for measuring changes in the self inductance of said coils due to the presence or absence of conductive material in said coded object, wherein said detection means include an oscillator, a multiplexor connected to at least one of said coils and to said oscillator, and an amplitude detector.

24. The sensory system of claim 1, wherein said object comprises a plurality of puzzle pieces on which said code is printed which is adapted to be read by said reader.

25. The sensory system of claim 1, wherein said object comprises a plurality of toy vehicles on which said code is printed which is adapted to be read by said reader.

26. An inductive sensory system for use in detecting the presence and location of one or more conductive objects, said system including:

at least one object including conductive material; and a reader for detecting the presence and location of said object, said reader including
   a plurality of single coils arranged in a pattern complimentary to all possible locations and positions of said at least one object and
   detection means for measuring changes in the self inductance of said coils due to the presence or absence of conductive material in said object.

27. The sensory system of claim 26, wherein said object comprises a stylus having said conductive material located at the end of said stylus.

* * * * *

UNITED STATES PATENT AND TRADEMARK OFFICE
CERTIFICATE OF CORRECTION

PATENT NO. : 5,791,648
DATED : August 11, 1998
INVENTOR(S) : G. Burnell Hohl

It is certified that error appears in the above-identified patent and that said Letters Patent is hereby corrected as shown below:

On the title page, item [21], "603,171" should read --603,174--.

Signed and Sealed this

Twenty-second Day of December, 1998

*Attest:*

BRUCE LEHMAN

*Attesting Officer*     *Commissioner of Patents and Trademarks*